March 25, 1930. F. W. STEERE 1,752,037
GAS MANUFACTURE
Filed July 27, 1926
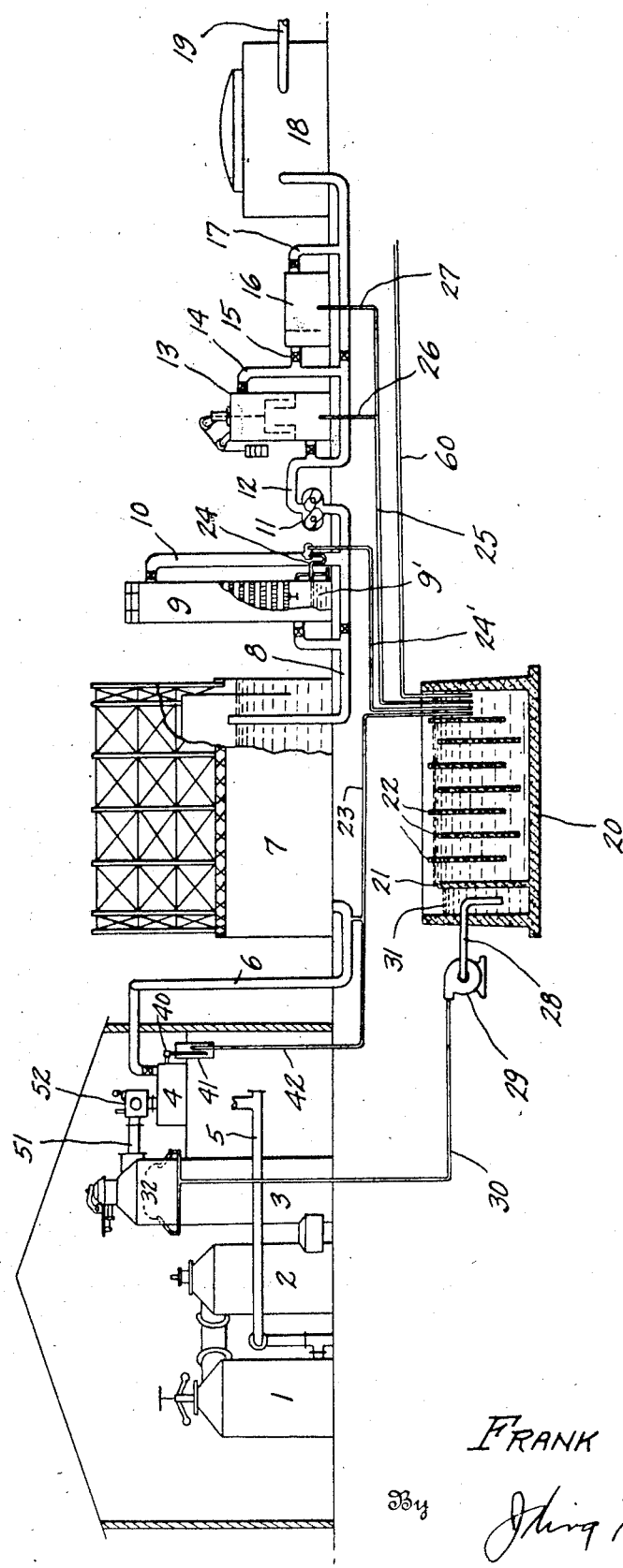
Inventor
FRANK W. STEERE
By Irving Harness
Attorney Patented Mar. 25, 1930

1,752,037

UNITED STATES PATENT OFFICE

FRANK W. STEERE, OF HIGHLAND PARK, MICHIGAN, ASSIGNOR TO SEMET-SOLVAY ENGINEERING CORPORATION, OF NEW YORK, N. Y., A CORPORATION OF NEW YORK

GAS MANUFACTURE

Application filed July 27, 1926. Serial No. 125,283.

It is rapidly becoming necessary for manufacturers to avoid the pollution of streams and bodies of water with waste materials discarded in the process of manufacturing. It has been the custom of gas manufacturers to dispose of the effluent liquor or condensate produced in the manufacture of water gas by emptying it into convenient streams or bodies of water and this practice has become somewhat objectionable and subject to some criticism, and it has become necessary to devise other means for disposing of this waste material.

The objects of my invention are, therefore, to provide a method of disposal and a means of utilizing all of the effluent liquor and condensate from a water gas plant using either coke or soft coal as a generator fuel.

A further object of my invention is to provide a method of disposal and a means of utilizing all or a large part of effluent liquor and condensate from a combination coal and water gas plant.

A further object of my invention is to provide a method of disposal of the effluent liquor and condensate from a water gas plant or a combination coal and water gas plant without emptying same into or in any way polluting any water courses or bodies of water.

It is a further object of my invention to utilize the said effluent liquor or condensate in the manufacture of gas and to utilize the sensible heat contained in such effluent liquor or condensate in the gas making process, and thereby effect a saving in the amount and cost of separately produced steam necessary to the manufacture of gas.

With these and other objects in view, my invention consists in the arrangement, combination and construction of the various parts of my improved gas manufacturing system, and in the process as described in the specification, claimed in my claims and shown in the accompanying drawing, in which:

The single figure is a side elevation of that part of a gas plant, with parts broken away necessary to illustrate the embodiment of my invention.

I have shown a gas plant consisting of a water gas generator 1, a carburetor 2 and, a superheater 3 connected in series, a wash box 4, a relief holder 7, a washer and cooler 9, an exhauster 11, a tar extractor 13, a multiple washer 16 and a purifier 18. The gas plant herein described can be used for the manufacture of blue water gas as well as for carburetted water gas. Whether the apparatus is used for the manufacture of blue water gas or carburetted water gas, each of the parts of the apparatus designated as the carburetor and the superheater acts as a heat regenerator. The plant is adapted to the making of either up or back steam runs, the water gas formed on the up run passing from the superheater 3 through the passage 51 and the valve 52 to the wash box 4, and from the wash box through the passage 6 to the relief holder 7, and the gas manufactured on the back run passing from the generator 1 through the passage 5 to the wash box 4 and from the wash box 4 through the passage 6 to the relief holder 7. The gas then passes from the relief holder 7 through the passage 8 to the washer and cooler 9, then through the passage 10 to the exhauster 11, through the passage 12 to the tar extractor 13, through the passages 14 and 15 to the multiple washer 16, through the passage 17 to the purifier 18, through the passage 19 to the storage holder (not shown). As customary the fuel bed in the generator is restored to incandescence after either the up or back runs by blasting with free oxygen, air, or other oxygen-containing gas, the resultant blast gases being passed into and through the carburetor and superheater, and burned therein so that the checkerbrick in these chambers becomes heated.

I have also shown a decanter 20 situated so as to receive all effluent liquor and condensate discarded during the operation of the plant. This decanter 20 may be constructed of any suitable material and in any form which will serve the purpose hereinafter described. I prefer a decanter of concrete construction and rectangular shape. Within the decanter are constructed a plurality of vertical partitions or baffles 22 so positioned as to permit the liquor received in one end of the decanter to pass through the decanter by flowing under the lower edge of one partition and over the upper edge of another partition, alternately. In one end of the decanter 20 is constructed a vertical partition 21 with its lower edge attached securely to the bottom of the decanter and having its upper edge somewhat lower than the sides of the decanter in order to permit the liquor to flow over its top and into the compartment 31. The compartment 31 is drained by the pipe 28 extending to the pump 29 and the pipe 30 extending from the pump 29 to the water sprays 32 which are positioned within the top of the superheater 3. The overflow from the wash box 4 passes through over-flow box 40 to seal pot 41, then through the passage 42 to passage 23 to decanter 20. The gas upon leaving the wash box 4 is well saturated with water, and as it passes through the passage 6 a portion of the water condenses in the lower part of the passage 6 and is drained therefrom by passage 23 into decanter 20. The gas upon leaving the relief holder 7 passes through the passage 8 and up through the washer and cooler 9 and meets and is washed and scrubbed by a counter current of water which is introduced into the top of the washer and cooler 9 and flows downward to the reservoir 9' in the bottom of the washer and cooler 9, where the water is taken off by the overflow pipe 24 which is connected with drain pipe 24' and is then conducted to the decanter 20. The gas passes out of the top of the water cooler 9 through the passage 10 into the exhauster 11, then through the passage 12 to the tar extractor 13 where other condensable constituents are removed. The condensate produced in the tar extractor 13 is carried therefrom by a pipe 26 to a pipe 25 to the decanter 20. The gas then passes out of the top of the tar extractor 13 through the passages 14 and 15 into the multiple washer 16 where it is further cleansed and further condensable constituents removed by the water introduced therein. The condensate formed in the washer 16 is passed therefrom through a pipe 27 to the pipe 25 and through pipe 25 to the decanter 20. This operation in the multiple washer completes the removal of the condensable constituents of the gas which passes from the multiple washer through the passage 17 to the purifier 18 and from the purifier 18 through the passage 19 to the storage holder (not shown). The passage 60 carries effluent liquor and condensate from a coal gas plant (not shown) to the decanter 20.

It is thus apparent that all effluent liquor and waste condensate liquor derived from the manufacture of gas is carried from the manufacturing system proper to the decanter 20 where it flows around the partitions in the decanter. The liquor, in passing through the decanter as described, stratifies and the sediment contained therein drops to the bottom of the decanter and remains there, and the light oils contained therein rise to the surface of the liquor and may be removed by any suitable means. Thus, the liquor which flows over the top of partition 21 into compartment 31 is almost entirely free from the sediment, oils, etc. which it contained when first received in the decanter. The pump 29 then draws the liquor from the compartment 31 through the pipe 28 and forces it through the pipe 30 and through the sprays 32 into the top of the superheater 3 where it is volatilized by the heat in the superheater and utilized in the manufacture of water gas during the back run of the cycle. An operation extending over several months has proved that all of the effluent liquor and condensate derived in the manufacture of water gas can be consumed in the manner described for the production of steam and other vapor, and that such utilization of the effluent liquor and condensate effects a considerable saving in the amount of steam separately produced in the manufacture of gas. It is also found that the sensible heat contained in the liquor and condensate makes it possible to produce steam with a less degree of heat in the top of the superheater than is required to vaporize unheated water and thereby effects a saving of fuel. It has also been proven by experiment that the operation and process described will, where coal gas plants are operated in connection with water gas plants, dispose of a part of the coal gas plant effluent, it being necessary only to provide means for conveying the effluent liquor and condensate resulting from manufacture of the coal gas to the decanter 20. The quality of coal gas effluent which can be disposed of in this way depends upon the ratio of the two processes employed. In many combination plants it will be found that all of the effluent liquor can be disposed of and in water gas plants all the effluent liquor that is customarily discharged from the plant can be utilized in the gas making process. It has also been found, after several months of completely successful operation of a water gas plant, that the effluent from the plant is not sufficient to supply all of the water necessary to making the back run steam in the top of the superheater, and that additional water or steam has to be supplied.

It is obvious that various changes may be made in the arrangement, combination and construction of the various parts of my improved apparatus and in the various steps of my process without departing from the spirit of my invention, and it is my intention to cover by my claims such changes as may be reasonably included within the scope thereof.

What I claim is:

1. The process of disposing of effluent waste liquors in the manufacture of water gas in a plant involving a generator and heat regenerator, which comprises passing the effluent liquors into a decanter for the stratification of the liquor, passing the aqueous layer into the heat regenerator to volatilize it, and passing the volatiles through the heat regenerator and into the generator to produce water gas.

2. The process of disposing of effluent waste liquors in the manufacture of water gas in a plant comprising a generator having a bed of fuel therein and a heat regenerator chamber, which involves blasting the fuel bed in said generator by passing an oxygen-containing gas therethrough and passing the resultant blast gases into and through the heat regenerator to heat said regenerator chamber, and thereafter introducing the effluent liquors into the heat regenerator to volatilize them, and passing the volatiles into and through the fuel bed in the generator to produce water gas.

3. The process of disposing of effluent waste liquors in the manufacture of water gas in a plant comprising a single generator having a bed of fuel therein, a single carburetor and a single superheater connected in series, the individual units being located in separate and detached shells, the generator being provided with a gas offtake independent of the connection between the generator and carburetor and leading directly from substantially the base of the generator, which involves blasting the fuel bed in the generator by passing an oxygen-containing gas therethrough and passing the resultant blast gases from the generator into and through the carburetor and superheater and introducing the effluent liquors into the superheater to volatilize them, passing the volatiles from the superheater into and through the carburetor, into the generator down through the fuel bed therein, and withdrawing the water gas thus formed through the gas offtake leading directly from substantially the base of the generator.

FRANK W. STEERE.